United States Patent

[11] 3,538,890

[72] Inventor Clark R. Torell
 Wells, Nevada (c/o University of Nevada Knoll Creek Field Lab., Jackpot, NV 89825)
[21] Appl. No. 733,013
[22] Filed May 29, 1968
[45] Patented Nov. 10, 1970

[54] AUTOMATIC ANIMAL CATCHING GATE
 6 Claims, 8 Drawing Figs.
[52] U.S. Cl. .................................................. 119/98
[51] Int. Cl. ............................................. A61d 03/00
[50] Field of Search .......................................... 119/98, 99

[56] References Cited
UNITED STATES PATENTS

| | | | |
|---|---|---|---|
| 1,502,155 | 7/1924 | O'Brien | 119/98 |
| 1,513,336 | 10/1924 | Mayes | 119/98 |
| 2,099,956 | 11/1937 | Flatley | 119/98 |
| 2,997,982 | 8/1961 | Trogdon | 119/98 |
| 3,043,269 | 7/1962 | Kausche | 119/98 |

Primary Examiner—Aldrich F. Medbery
Attorney—Clarence A. O'Brien and Harvey B. Jacobson ABSTRACT: A pair of opposite side gate members pivotally supported for swinging movement about spaced generally parallel axes toward generally coplanar animal retaining positions extending toward each other with at least portions of their free swinging edge portions spaced slightly apart to snugly receive the neck of an animal therebetween, the gate members being swingable from the animal retaining positions thereof to animal releasing positions with the free swinging edge portions spaced outwardly of one side of the plane containing the axis of rotation of said gate members and said portions of the free swinging portions based wide apart to pass an animal therebetween. The gate members are also swingable from the animal releasing positions to animal catching positions with the free swinging edge portions spaced slightly further apart than when the gate members are in the animal retaining position so as to receive the head but not the shoulders of an animal therebetween when the animal is advanced headfirst toward the free swinging edge portions of the gate members from the side of the coplanar positions of the gate members to which the free swinging edge portions of the gate members are swingable.

Patented Nov. 10, 1970
3,538,890
Sheet 1 of 2
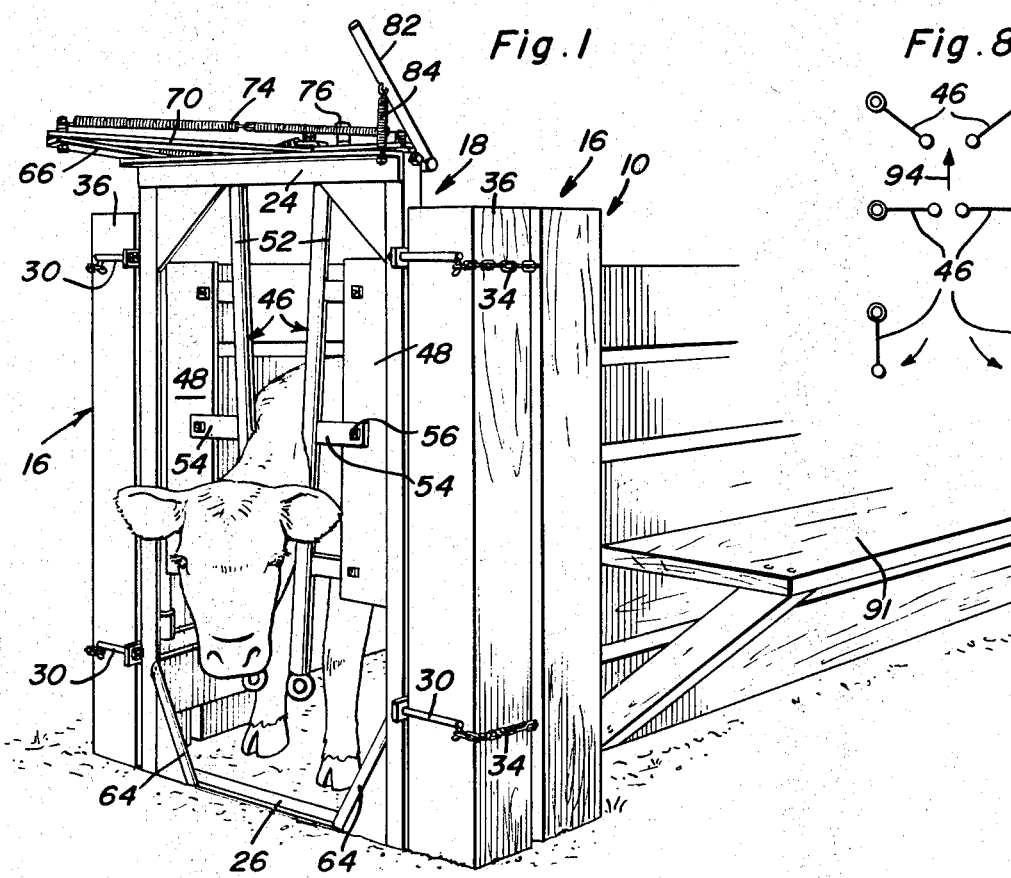
Fig. 1
Fig. 8
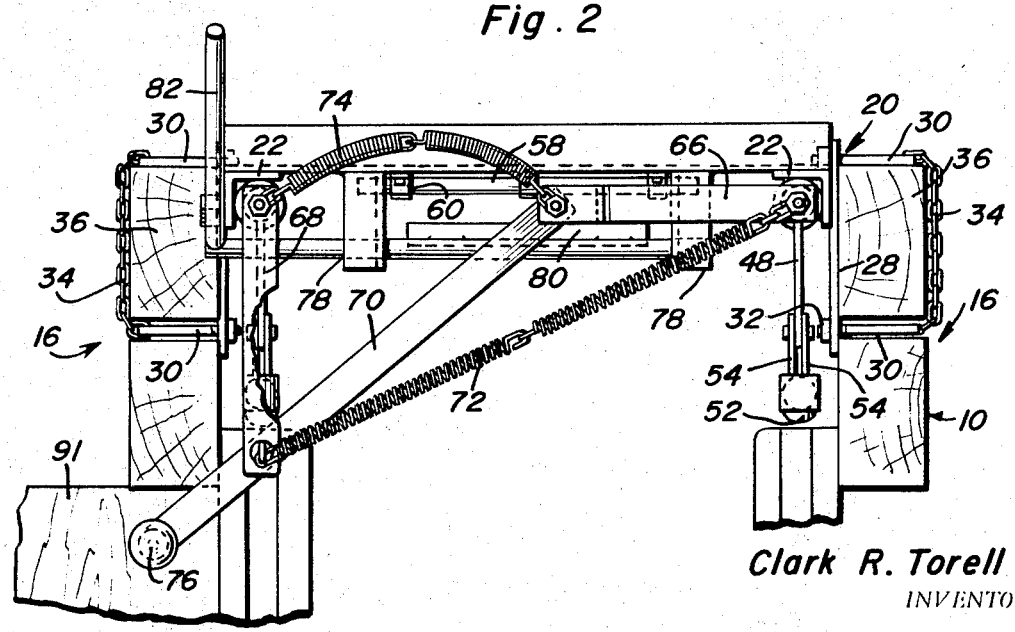
Fig. 2
Clark R. Torell
INVENTOR.
BY Clarence A. O'Brien
and Harvey B. Jacobson
Attorneys Patented Nov. 10, 1970
3,538,890
Sheet 2 of 2
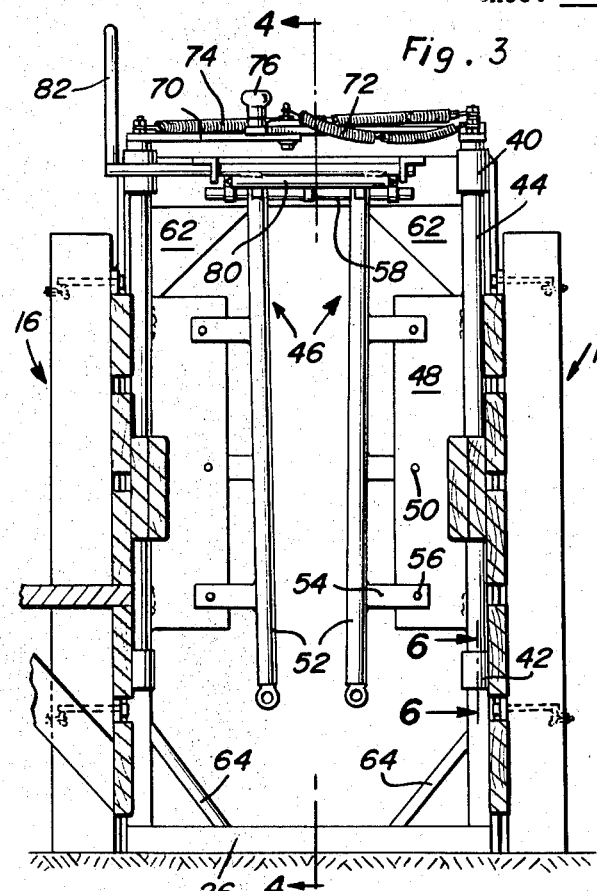
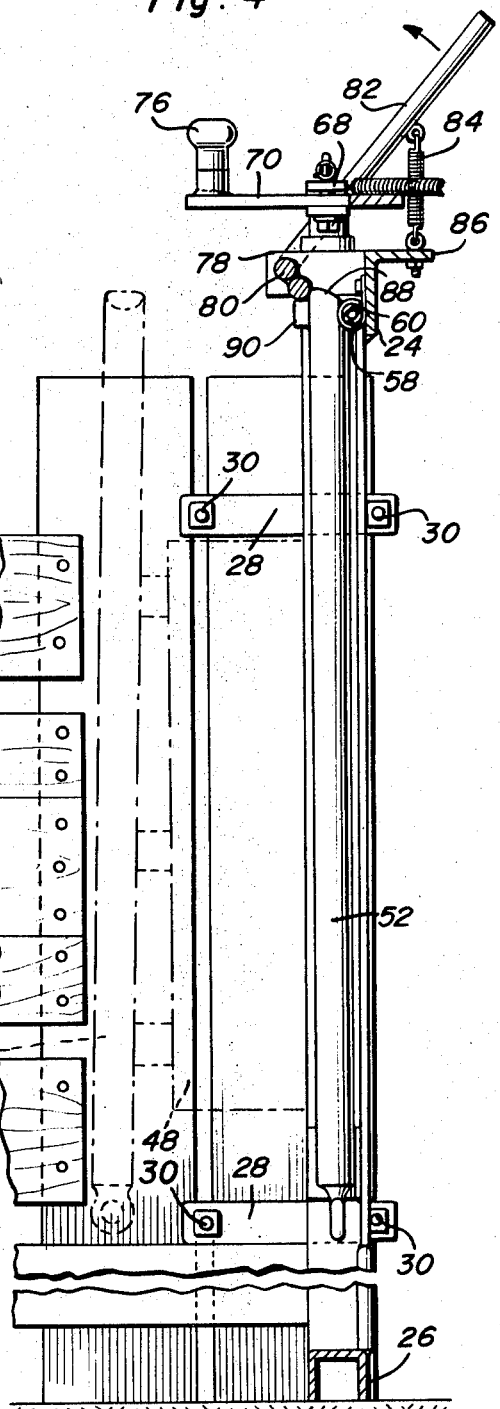
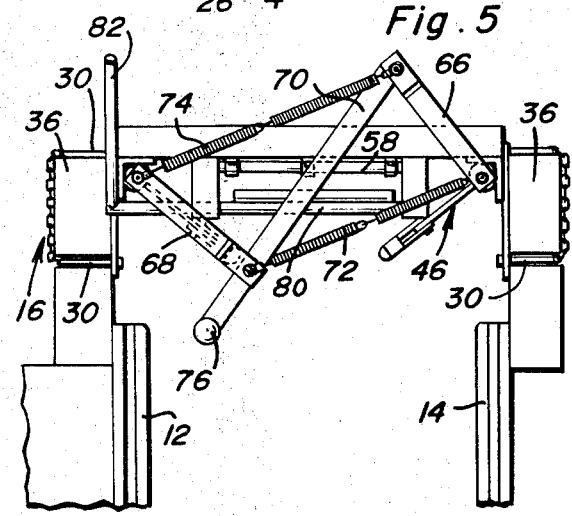
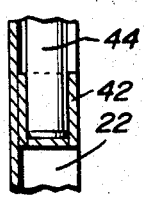
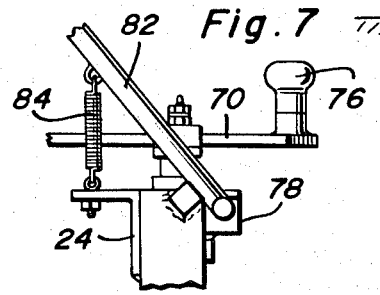
Clark R. Torell
INVENTOR.
BY *Clarence A. O'Brien*
and *Harvey B. Jacobson*
Attorneys

AUTOMATIC ANIMAL CATCHING GATE

The animal catching gate of the instant invention has been specifically designed to provide a means by which an animal passing through an associated chute toward the catching gate will automatically catch himself as he attempts to move past the gate. The swingable gate members of the gate include free swinging edge portions which are swingable only to the side of the gate toward which animals to be caught are advanced and means is provided for preventing swinging of the free swinging edge portions of the gate members in the direction of advance of the animal past coplanar closed positions of the gate members.

The gate members are first positioned with their free swinging edge portions spaced slightly to the side of the gate toward which the animal is to be advanced and with the free swinging edge portions of the gate members spaced apart to receive therebetween the head but not the shoulders of the animal to be caught. Then, as the animal passes his head between the gate members and his shoulders contact the free swinging edge portions of the gate members, the gate members are pivoted to the coplanar positions as the animal attempts to pass therethrough with movement of the gate members to the coplanar positions reducing the spacing between the free swinging edge portions of the gate members and thereby preventing retraction of the head of the animal from between the free swinging edge portions of the gate member. When it is desired to release the animal which is caught, the gate members are swung past the initial animal catching position of the gate members to positions with the free edge portions of the gate members swung wide apart to pass the animal therebetween. In addition, means is provided for interlocking the gate members for simultaneous swinging movement and for yieldingly urging the gate members toward the animal catching positions thereof from both the animal retaining and animal releasing position thereof.

The main object of this invention is to provide an animal catching gate which will automatically catch an animal advanced theretoward and which attempts to pass between the gate members of the gate.

A further object of this invention provides an animal catching gate which will require actuation by a single operator only for the purpose of moving the gate members from the animal retaining positions, to the animal releasing positions when it is desired to release an animal which has been caught.

Still another object of this invention is to provide an animal catching gate which may be readily operatively supported from the discharge end of a chute for guiding the animals to be caught toward the gate.

A final object of this invention to be specifically enumerated herein is to provide an automatic animal catching gate which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the discharge end of a chute with which the animal catching gate of the instant invention is operatively associated and with the gate members illustrated in animal retaining positions with the neck of an animal snugly retained between the free swinging edge portions of the gate members;

FIG. 2 is a top plan view of the assemblage illustrated in FIG. 1 with the gate members in the full animal releasing positions;

FIG. 3 is a fragmentary vertical sectional view taken upon a plane passing through the chute structure slightly rearward of the animal catching gate and with the gate members of the gate in the animal retaining positions;

FIG. 4 is an enlarged fragmentary vertical sectional view taken substantially upon a plane indicated by section line 4—4 of FIG. 3 and with an alternate position of one of the gate members being illustrated in phantom lines;

FIG. 5 is a top plan view of the assemblage illustrated in FIG. 3 but with the gate members in the slightly open animal catching positions;

FIG. 6 is an enlarged fragmentary vertical sectional view taken substantially upon a plane indicated by the section line 6—6 of FIG. 3;

FIG. 7 is a fragmentary side elevational view of the gate member releasing mechanism for releasing the gate members from the animal retaining positions as seen from the left hand side of the animal catching gate; and FIG. 8 is a diagrammatical view illustrating the animal catching, retaining and releasing position of the gate members.

Referring now more specifically to the drawings the numeral 10 generally designates an animal chute with whose exit end the animal catching gate of the instant invention is operatively associated. The chute 10 includes opposite side walls 12 and 14 which terminate at their discharge end of the chute 10 at end post structures 16.

The animal catching gate is generally referred to by the reference numeral 18 and includes a mounting frame referred to by the reference numeral 18 and includes a mounting frame referred to in general by the reference numeral 20 and which includes a pair of upstanding opposite side frame members 22 interconnected at their upper and lower ends by means of transverse frame members 24 and 26. Each of the members 22 has a pair of vertically spaced and horizontal mounting straps 28 secured thereto and which extend generally normal to the plane of the main frame 20. Each mounting strap 28 has a pair of opposite end bores (not shown) formed therethrough and a pair of threaded studs 30 have corresponding ends secured through the opposite ends of each mounting strap 28 by means of suitable threaded fasteners 32. The other pair of corresponding ends of each pair of studs 30 are interconnected by means of a flexible tension member such as a length of chain 34 and therefore each mounting strap 28, its studs 30 and the corresponding chain 34 comprises a clamp assembly for clampingly engaging the associated post element 36 of the corresponding end post structure 16 and thus the mounting straps 28 serve to support the main frame 20 from the post elements 36.

Upper and lower aligned journal members 40 and 42 are supported from each of the members 22 and rotatably journal upper and lower end portions of a pivot post defining member 44 on an associated gate member generally referred to by reference numeral 46. Each gate member 46 includes a mounting panel portion 48 secured thereto and which projects generally radially outwardly therefrom. Each mounting panel portion 48 includes a freestanding vertical edge portion remote from the corresponding pivot post defining member 44 having a plurality of vertically spaced apertures 50 formed therein by which an upstanding post 52 defining the free swinging edge portion of the gate member 46 is supported by means of a plurality of laterally extending arms 54 secured to the corresponding mounting panel portion 48 by means of a plurality of fasteners 56 secured through arms 54 and the apertures 50.

The upstanding posts 52 may be adjustably supported from the mounting plate portions 48 so as to vary the spacing therebetween when the gate members 46 are in the closed positions illustrated in FIGS. 1 and 3 of the drawings, if desired. However, the posts 52 are downwardly convergent so as to define a narrow opening therebetween at their lower ends for smaller animals and a larger opening therebetween at their upper ends for larger animals. The upper transverse member 24 has an elongated resilient member 58 secured thereto by means of suitable fastener mounted clips 60 and the elongated resilient member 58 is engageable by the upper ends of the posts 52 when the gate members 46 are swung to their closed position so as to limit swinging movement of the gate members 46 to the closed positions. Also, the elongated resilient member 58 provides a yieldable stop for the gate member 46 and thereby enables the free ends of the latter to swing slightly past the full closed positions as will be hereinafter more fully set forth.

The upper transverse member 24 is braced in relation to the upstanding members 22 by means of triangular gusset plates 62 and the lower transverse member 26 is braced relative to the lower ends of the upstanding members 22 by means of brace members 64.

The upper end of one of the pivot post defining members 44 includes a first crank arm 66 and the second pivot post defining member 44 includes a crank arm 68. A connecting link 70 is pivotally connected at its opposite ends to the free ends of the crank arms 66 and 68. In addition, an elongated expansion spring assembly 72 is connected between the free end of the crank arm 68 and the upper end of the pivot post defining member 44 of the other gate member 46 and an expansion spring assembly 74 is connected between the free ends of the crank arm 66 and the pivot post defining member 44 of the other gate member 46. The expansion spring assembly 72 yieldingly urges the gate member 46 toward the partially open animal catching positions of the gate members 46 illustrated in FIG. 5 of the drawings from the fully closed animal retaining positions of the gate members 46 and the expansion spring assembly 74 yieldingly urges the gate members 46 from the full open animal releasing positions thereof illustrated in FIG. 2 of the drawings toward the partially open animal catching positions illustrated in FIG. 5 of the drawings.

The free end of the connecting link or member 70 remote from the crank arm 66 includes an upwardly projecting actuating knob or handle 76 disposed at one side of the chute and the upper transverse member 24 includes a pair of rearwardly projecting pivot brackets 78 between which an elongated cam latch member 80 is journaled. The end of the cam latch member 80 adjacent the actuating knob 76 is provided with a crank arm 82 and an expansion spring 84 is connected between the crank arm 82 and the forwardly projecting horizontal flange portion 86 of the upper transverse member 24.

As can best be seen from FIG. 4 of the drawings the upper ends of the posts 52 are beveled as at 88 to provide cam surfaces engageable with the cam latch member 80 and include stops 90 also engageable by the cam latching member 80.

In operation, the gate members 46 are automatically (by springs) urged to the partially opened animal catching position with the free ends of the gate members 46 swung slightly rearwardly of the plane in which the gate members 46 is disposed when fully closed. Then, as an animal passes forwardly through the associated chute, the head of the animal enters between the spaced apart posts 52. However, the spacing between the posts 52 is not sufficient to pass the shoulders of the animal therebetween and therefore continued forward movement of the animal automatically pivots the gate members 46, against the biasing force of the springs urging them toward the animal catching positions, to the fully closed animal retaining positions illustrated in FIGS. 1 and 3 of the drawings. As the gate members 46 are swung to the animal retaining positions, the beveled upper ends of the post 52 cam the latch member 80 upwardly and pass therebeneath until the posts 52 abut the elongated member 58 at which point the cam latch member 80 will swing down behind the upper ends of the posts 52 as illustrated in FIG. 4 of the drawings so as to releasably lock the gate members 46 in the fully closed animal retaining positions.

After the animal has been inspected or identification tags or the like have been applied thereto, the knob 76 may be grasped by an operator standing on the elevated walk 91 extending along chute 10 and pulled rearwardly subsequent to the crank arm 82 being swung rearwardly at its upper end in order to release the gate members 46 whereby the gate members 46 will be swung from the fully closed animal retaining positions illustrated in FIG. 3 of the drawings to the full open position illustrated in FIG. 2 of the drawings releasing the animal and thus allowing the animal to complete its forward movement through the associated chute. Thereafter, the knob 76 is released and the spring assembly 72 automatically returns the gate members 46 to the animal catching position illustrated in FIG. 5.

Attention is invited to FIG. 8 of the drawings wherein the arrow 94 indicates the direction of movement of the animal through the chute 10. The gate members 46 are first positioned by the spring assemblies 72 and 74, in position a. As the animal engages the free swinging edge portions of the gate members 46 with its shoulders, the gate members 46 swing toward and are latched in the fully closed position b. Then, after the crank arm 82 has been pulled rearwardly at its upper end, the knob 76 is pulled rearwardly for swinging the gate members 46 to the full open position c.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. An animal catching gate including a pair of opposite side gate members pivotally supported for swinging in unison about spaced generally parallel axes toward generally coplanar animal retaining positions extending toward each other with at least portions of their free swinging edge portions spaced slightly apart to snugly receive the neck of an animal therebetween, said gate members having means for providing swinging movement from said coplanar positions to generally parallel animal releasing positions with said edge portions spaced outwardly of one side of a plane containing said axes and said portions spaced wide apart to pass said animal therebetween, and including means for subsequently swinging in opposite directions to animal catching positions with said edge portions spaced only slightly outwardly of said one side of said plane and said portions spaced slightly further apart than when said gate members are in said animal retaining positions to receive the head but not the shoulders of said animal therebetween when said animal is advanced head first toward said edge portions from said one side of said plane, urging means operative to yieldingly urge said gate members from said animal retaining and releasing positions toward said animal catching positions, and retaining means operatively associated with said gate members for automatically releasably retaining said gate members in said animal retaining position in response to movement of said gate members to said animal retaining positions, the last mentioned means including means for automatically terminating swinging movement of said gate members from said animal catching positions toward said animal retaining positions as said gate members reach said animal retaining positions.

2. The combination of claim 1 wherein the free swinging edge portions of said gate member, when the latter are in said animal retaining positions, are downwardly convergent so as to be adapted to catch a small animal between their lower end portions and larger animals between their upper end portions.

3. The combination of claim 1 said retaining means also includes manually actuatable means rendering said retaining means inoperable to retain said gate member in said animal retaining position.

4. The combination of claim 1 wherein said urging means includes an arm carried by the pivoted edge portion of one of said gate members and projecting outwardly to said other side of said plane and disposed generally normal thereto when said gate members are disposed in said animal retaining positions, first elongated flexible expansion spring means connected at one end to the free end portion of said arm and at the other end to a stationary point adjacent the pivot axis of the other gate member, and second elongated flexible expansion spring means connected at one end to the free edge portion of the other gate member and the other end to a stationary point adjacent the pivot axis of said one gate member, said spring means being generally equally tensioned when said gate members are in said animal catching position.

5. The combination of claim 1 wherein said axes are disposed upright and said urging means and said retaining means are operatively associated with the upper ends of said gate members and free of portions thereof connected therebetween below the upper terminal end portions of said gate members.

6. The combination of claim 1 wherein said urging means includes an arm carried by the pivoted edge portion of one of said gate members and projecting outwardly to said other side of said plane and disposed generally normal thereto when said gate members are disposed in said animal retaining positions, first elongated flexible expansion spring means connected at one end to the free end portion of said arm and at the other end to a stationary point adjacent the pivot axis of the other gate member, and second elongated flexible expansion spring means connected at one end to the free edge portion of the other gate member and at the other end to a stationary point adjacent the pivot axis of said one gate member, said spring means being generally equally tensioned when said gate members are in said animal catching position, an elongated connecting link pivotally secured between the free end of said arm and the free edge portion of said other gate member.